(12) United States Patent
Vaughn et al.

(10) Patent No.: US 10,823,146 B2
(45) Date of Patent: Nov. 3, 2020

(54) SYSTEM AND METHOD FOR CONTROLLING A WIND TURBINE TO MINIMIZE ROTOR BLADE DAMAGE

(71) Applicant: General Electric Company, Schenectady, NY (US)

(72) Inventors: Clovis Dillon Vaughn, Clifton Park, NY (US); Robert Peter Slack, Seattle, WA (US); Michael James Rizzo, Rotterdam, NY (US)

(73) Assignee: General Electric Company, Schenectady, NY (US)

( * ) Notice: Subject to any disclaimer, the term of this patent is extended or adjusted under 35 U.S.C. 154(b) by 197 days.

(21) Appl. No.: 16/008,145

(22) Filed: Jun. 14, 2018

(65) Prior Publication Data

US 2019/0383266 A1   Dec. 19, 2019

(51) Int. Cl.
*F03D 7/04* (2006.01)
*F03D 17/00* (2016.01)
*F03D 7/02* (2006.01)

(52) U.S. Cl.
CPC .......... *F03D 7/042* (2013.01); *F03D 7/0204* (2013.01); *F03D 7/0224* (2013.01); *F03D 7/0264* (2013.01); *F03D 17/00* (2016.05); *F05B 2260/8211* (2013.01); *F05B 2270/1021* (2013.01); *F05B 2270/1095* (2013.01)

(58) Field of Classification Search
CPC ...... F03D 7/042; F03D 7/0264; F03D 7/0224; F03D 17/00; F03D 7/0204; F03D 7/0292; F05B 2260/8211; F05B 2270/1021; F05B 2270/1095; F05B 2270/328; F05B 2270/331

USPC ............................................................ 416/9
See application file for complete search history.

(56) References Cited

U.S. PATENT DOCUMENTS 9,714,085 B2    7/2017  White et al.
2007/0018457 A1*  1/2007  Llorente Gonzalez ..................... F03D 7/0264
                                                                    290/44

(Continued)

FOREIGN PATENT DOCUMENTS

EP       2 772 643 A2    9/2014
EP       3 088 733 A1    11/2016
WO       WO-2016169964 A1 * 10/2016 ........... F03D 7/0224

OTHER PUBLICATIONS

Extended European Search Report, dated Oct. 22, 2019.

*Primary Examiner* — J. Todd Newton
(74) *Attorney, Agent, or Firm* — Dority & Manning, P.A.

(57) ABSTRACT

A method for monitoring and controlling a wind turbine to minimize rotor blade damage includes receiving sensor data from one or more sensors indicative of at least one blade parameter of the rotor blade over a predetermined time period. The method also includes trending the sensor data for the predetermined time period with respect to at least one wind parameter. Further, the method includes determining at least one characteristic of the trended sensor data. Moreover, the method includes comparing the at least one characteristic of the trended sensor data to an operating threshold. In addition, the method includes implementing a control action if the comparison of the at least one characteristic of the trended sensor data and the operating threshold indicates blade damage is occurring or is likely to occur.

18 Claims, 5 Drawing Sheets

(56) References Cited

U.S. PATENT DOCUMENTS

| | | | |
|---|---|---|---|
| 2013/0099497 A1* | 4/2013 | Bowyer | F03D 7/042 |
| | | | 290/44 |
| 2013/0106108 A1* | 5/2013 | De Boer | F03D 7/045 |
| | | | 290/44 |
| 2014/0241878 A1* | 8/2014 | Herrig | F03D 7/00 |
| | | | 416/1 |
| 2015/0240788 A1* | 8/2015 | Kayama | G01N 19/08 |
| | | | 416/61 |
| 2016/0312767 A1* | 10/2016 | Wilson | F03D 9/25 |
| 2017/0058870 A1* | 3/2017 | Bertolotti | F03D 7/0224 |
| 2019/0154001 A1* | 5/2019 | Ostergaard | F03D 7/0224 |
| 2019/0178852 A1* | 6/2019 | Raso | G01N 29/4427 |
| 2019/0203694 A1* | 7/2019 | Gupta | F03D 7/0224 |

* cited by examiner

SYSTEM AND METHOD FOR CONTROLLING A WIND TURBINE TO MINIMIZE ROTOR BLADE DAMAGE

FIELD

The present subject matter relates generally to wind turbines and, more particularly, to a system and method for monitoring and controlling a wind turbine during operation thereof so as to minimize rotor blade damage.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

To ensure that wind power remains a viable energy source, efforts have been made to increase energy outputs by modifying the size and capacity of wind turbines. One such modification has been to increase the length of the rotor blades. The rotor blades, however, can be one of the least digitally connected components of the wind turbine even though they can also be the most costly. While catastrophic blade failures are a relatively rare occurrence, such failures have the potential to bring down an entire turbine.

To prevent such failures, conventional blade monitoring systems determine blade angle set points for the rotor blades based on wind speed algorithms, weather reports, and/or through routine inspection. Related component and/or weather anomalies may also be detected (such as pitch system component failures, storm shutdown messages, etc.). However, conventional blade monitoring technologies fail to consider the structural aspects and unique loading of each individual blade.

Accordingly, the art in continuously seeking new and improved systems and methods for monitoring and controlling a wind turbine (such as rotor blades, pitch bearings, pitch systems, associated sensors, etc.) during operation thereof that provides reliable data without the excessive complexity and costs.

BRIEF DESCRIPTION

Aspects and advantages of the present subject matter will be set forth in part in the following description, or may be obvious from the description, or may be learned through practice of the invention.

In one aspect, the present subject matter is directed to a method for controlling a wind turbine to minimize rotor blade damage. The method includes receiving, via a controller, sensor data from one or more sensors indicative of at least one blade parameter of a rotor blade of the wind turbine over a predetermined time period. The method also includes trending, via the controller, the sensor data for the predetermined time period with respect to at least one wind parameter and/or an environmental condition. Further, the method includes determining, via the controller, at least one characteristic of the trended sensor data. Moreover, the method includes comparing, via the controller, the at least one characteristic of the trended sensor data to an operating threshold. In addition, the method includes implementing a control action if the comparison of the characteristic(s) of the trended sensor data and the operating threshold indicates blade damage is occurring or is likely to occur.

In one embodiment, the blade parameter(s) may include a pitch angle, a blade mass moment, or any other suitable blade parameter capable of indicating the structural and/or loading characteristics of the rotor blade. In another embodiment, the wind and/or environmental parameter(s) may include wind speed, wind direction, wind turbulence, wind shear, wake, temperature, lightning strikes, air density, and/or combinations thereof.

In further embodiments, the characteristic(s) of the trended sensor data may include, for example, an average and/or a standard deviation of the sensor data. In several embodiments, the step of comparing the characteristic(s) of the trended sensor data to the operating threshold may include determining whether the characteristic(s) of the trended sensor data deviates from the damage threshold by a predetermined amount for a certain wind speed range. In alternative embodiments, the step of comparing the characteristic(s) of the trended sensor data to the operating threshold may include determining whether the characteristic(s) of the trended sensor data deviates from the damage threshold for a certain time period within the predetermined time period.

In additional embodiments, the step of implementing the control action may include altering one or more of a pitch angle of the rotor blade, a speed of the wind turbine, a power of the wind turbine, or a thrust of the wind turbine, shutting down the wind turbine, or yawing a nacelle of the wind turbine.

In several embodiments, the method may include sending a notification signal to a user if the characteristic(s) of the trended sensor data deviates from the operating threshold. For example, in one embodiment, the notification signal may include a description of which of the rotor blade axes is affected rotor blade and/or a behavior of the rotor blade.

In particular embodiments, the method may also include receiving an instruction from a user indicative of whether to implement the control action if the comparison of the characteristic(s) of the trended sensor data and the operating threshold indicates blade damage is occurring or is likely to occur.

In another aspect, the present disclosure is directed to a method for controlling a wind turbine to minimize rotor blade damage. The method includes receiving sensor data from one or more sensors indicative of blade mass-moment behavior of the rotor blade over a predetermined time period. The method also includes trending the sensor data for the predetermined time period with respect to wind speed. Further, the method includes determining at least one characteristic of the trended sensor data. Moreover, the method includes comparing the characteristic(s) of the trended sensor data to an operating threshold. In addition, the method includes modifying a pitch angle set point of the rotor blade if the comparison of the characteristic(s) of the trended sensor data and the operating threshold indicates blade damage is occurring or is likely to occur.

In yet another aspect, the present disclosure is directed to a system for controlling a rotor blade of a wind turbine to minimize blade damage. The system includes at least one sensor for generating sensor data indicative of at least one blade parameter of the rotor blade over a predetermined time period and a controller communicatively coupled to the at least one sensor. The controller includes a processor and associated memory device. The memory device includes instructions that, when implemented by the processor, configure the controller to perform one or more operations, including but not limited to trending the sensor data for the predetermined time period with respect to at least one wind parameter, determining at least one characteristic of the trended sensor data, comparing the at least one characteristic of the trended sensor data to an operating threshold, and implementing a control action if the comparison of the characteristic(s) of the trended sensor data and the operating threshold indicates blade damage is occurring or is likely to occur.

These and other features, aspects and advantages of the present subject matter will become better understood with reference to the following description and appended claims. The accompanying drawings, which are incorporated in and constitute a part of this specification, illustrate embodiments of the present subject matter and, together with the description, serve to explain the principles of the present subject matter.

BRIEF DESCRIPTION OF THE DRAWING

A full and enabling disclosure of the present subject matter, including the best mode thereof, directed to one of ordinary skill in the art, is set forth in the specification, which makes reference to the appended figures, in which.

DETAILED DESCRIPTION

Figure 1:
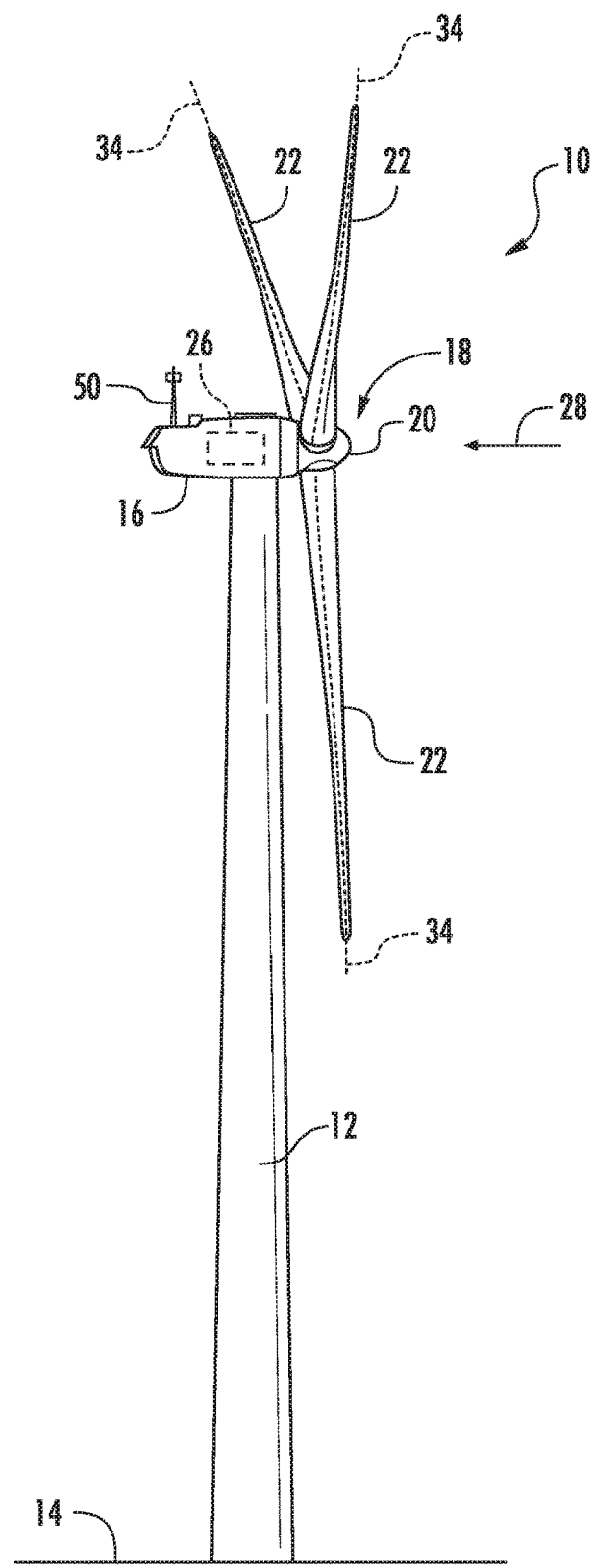
FIG. 1 illustrates a perspective view of one embodiment of a wind turbine according to the present disclosure.

Reference now will be made in detail to embodiments of the present subject matter, one or more examples of which are illustrated in the drawings. Each example is provided by way of explanation, not limitation of the present subject matter. In fact, it will be apparent to those skilled in the art that various modifications and variations can be made in the present subject matter without departing from the scope or spirit of the present subject matter. For instance, features illustrated or described as part of one embodiment can be used with another embodiment to yield a still further embodiment. Thus, it is intended that the present subject matter covers such modifications and variations as come within the scope of the appended claims and their equivalents.

Referring now to the drawings, FIG. 1 illustrates perspective view of one embodiment of a wind turbine 10 according to the present disclosure. As shown, the wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

Figure 2:
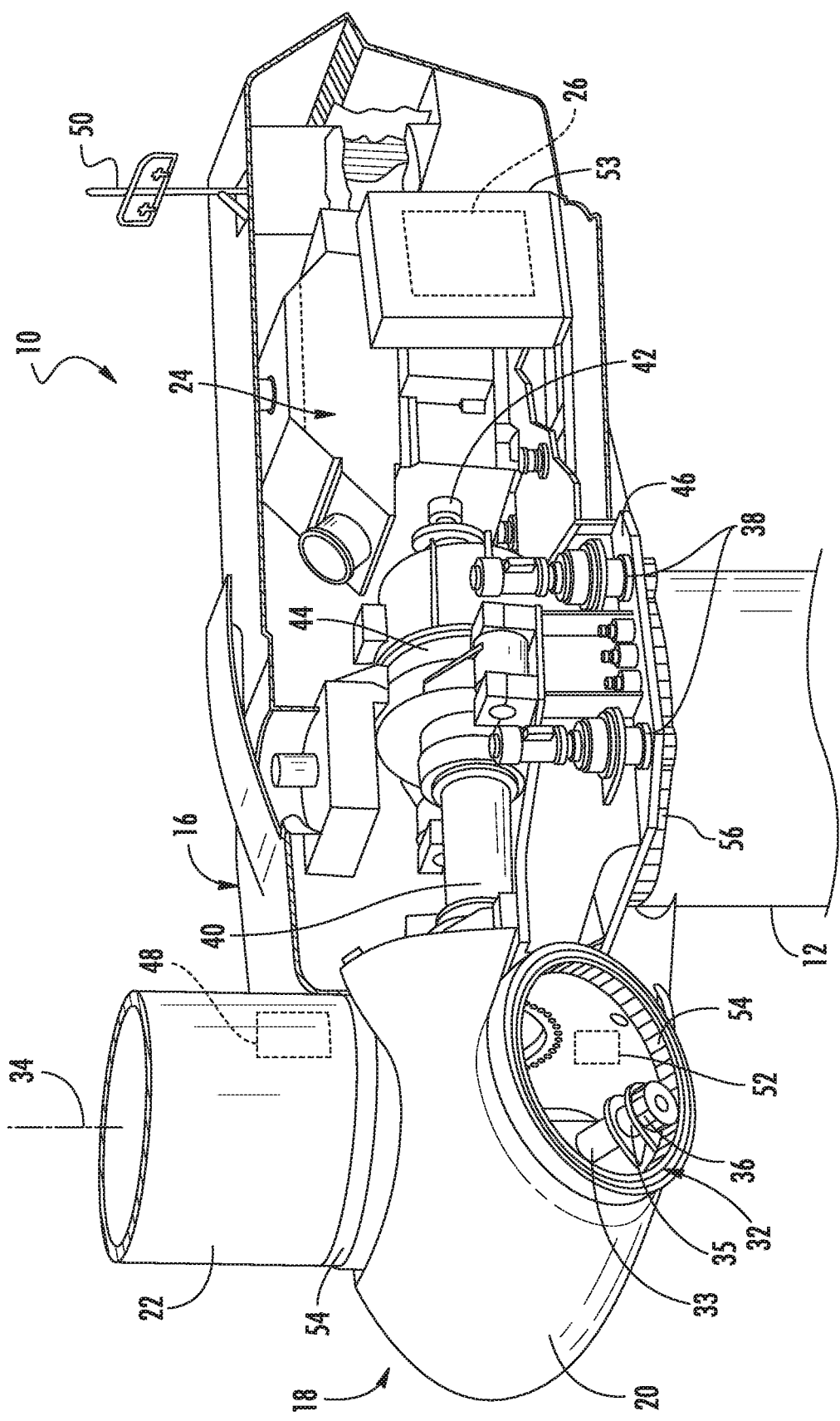
FIG. 2 illustrates a perspective, internal view of one embodiment of a nacelle of a wind turbine according to the present disclosure.

Referring now to FIG. 2, a simplified, internal view of one embodiment of the nacelle 16 of the wind turbine 10 is illustrated. As shown, a generator 24 may be disposed within the nacelle 16. In general, the generator 24 may be coupled to the rotor 18 of the wind turbine 10 for generating electrical power from the rotational energy generated by the rotor 18. For example, the rotor 18 may include a main shaft 40 coupled to the hub 20 for rotation therewith. The generator 24 may then be coupled to the main shaft 40 such that rotation of the main shaft 40 drives the generator 24. For instance, in the illustrated embodiment, the generator 24 includes a generator shaft 42 rotatably coupled to the main shaft 40 through a gearbox 44. However, in other embodiments, it should be appreciated that the generator shaft 42 may be rotatably coupled directly to the main shaft 40. Alternatively, the generator 24 may be directly rotatably coupled to the main shaft 40. In addition, as shown, it should be appreciated that the main shaft 40 may generally be supported within the nacelle 16 by a support frame or bedplate 46 positioned atop the wind turbine tower 12.

As shown in FIGS. 1 and 2, the wind turbine 10 may also include a turbine control system or a turbine controller 26 within the nacelle 16. For example, as shown in FIG. 2, the turbine controller 26 is disposed within a control cabinet 53 mounted to a portion of the nacelle 16. However, it should be appreciated that the turbine controller 26 may be disposed at any location on or in the wind turbine 10, at any location on the support surface 14 or generally at any other location. The turbine controller 26 may generally be configured to control the various operating modes (e.g., start-up or shutdown sequences) and/or components of the wind turbine 10.

Each rotor blade 22 may also include a pitch adjustment mechanism 32 configured to rotate each rotor blade 22 about its pitch axis 34. Further, each pitch adjustment mechanism 32 may include a pitch drive motor 33 (e.g., any suitable electric, hydraulic, or pneumatic motor), a pitch drive gearbox 35, and a pitch drive pinion 36. In such embodiments, the pitch drive motor 33 may be coupled to the pitch drive gearbox 35 so that the pitch drive motor 33 imparts mechanical force to the pitch drive gearbox 35. Similarly, the pitch drive gearbox 35 may be coupled to the pitch drive pinion 36 for rotation therewith. The pitch drive pinion 36 may, in turn, be in rotational engagement with a pitch bearing 54 coupled between the hub 20 and a corresponding rotor blade 22 such that rotation of the pitch drive pinion 36 causes rotation of the pitch bearing 54. Thus, in such embodiments, rotation of the pitch drive motor 33 drives the pitch drive gearbox 35 and the pitch drive pinion 36, thereby rotating the pitch bearing 54 and the rotor blade 22 about the pitch axis 34. Similarly, the wind turbine 10 may include one or more yaw drive mechanisms 38 communicatively coupled to the controller 26, with each yaw drive mechanism(s) 38 being configured to change the angle of the nacelle 16 relative to the wind (e.g., by engaging a yaw bearing 56 of the wind turbine 10).

In addition, as shown in FIG. 2, one or more sensors 48, 50, 52 may be provided on the wind turbine 10. More specifically, as shown, a blade sensor 48 may be configured with one or more of the rotor blades 22 to monitor the rotor blades 22. Such blade sensors 48, for example, may be configured to monitor various blade parameters of the rotor blades 22, such as blade mass moments, etc. Further, as shown, a wind sensor 50 may be provided on the wind turbine 10. For example, the wind sensor 50 may a wind vane, and anemometer, a LIDAR sensor, or another suitable sensor that measures wind speed and/or direction. As such, the sensors 48, 50, 52 may further be in communication with the controller 26, and may provide related information to the controller 26. In addition, as shown, the pitch drive mechanism(s) 32 described herein may include a sensor 52 for monitoring the pitch angle of the rotor blade(s) 22.

It should also be appreciated that, as used herein, the term "monitor" and variations thereof indicates that the various sensors of the wind turbine 10 may be configured to provide a direct measurement of the parameters being monitored and/or an indirect measurement of such parameters. Thus, the sensors described herein may, for example, be used to generate signals relating to the parameter being monitored, which can then be utilized by the controller 26 to determine the condition.

Figure 3:
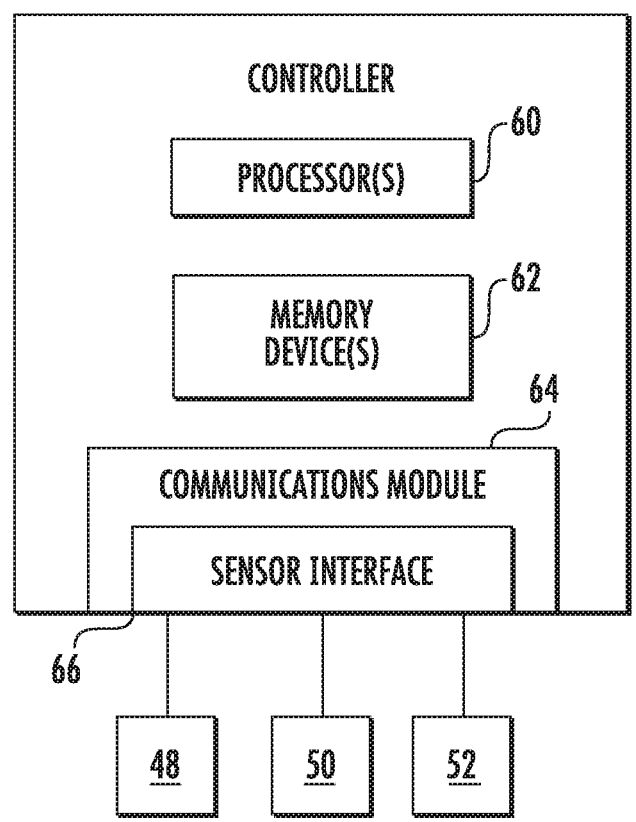
FIG. 3 illustrates a schematic diagram of one embodiment of suitable components that may be included in a wind turbine controller according to the present disclosure.

Referring now to FIG. 3, there is illustrated a block diagram of one embodiment of suitable components that may be included within the controllers 26 according to the present disclosure. As shown, the controllers 26 of the present disclosure may include one or more processor(s) 60 and associated memory device(s) 62 configured to perform a variety of computer-implemented functions (e.g., performing the methods, steps, calculations and the like and storing relevant data as disclosed herein). Additionally, the controllers 26 may also include a communications module 64 to facilitate communications between the controllers 26 and the various components of the wind turbine 10. Further, the communications module 64 may include a sensor interface 66 (e.g., one or more analog-to-digital converters) to permit signals transmitted from one or more sensors 48, 50, 52 to be converted into signals that can be understood and processed by the processors 60. It should be appreciated that the sensors 48, 50, 52 may be communicatively coupled to the communications module 64 using any suitable means. For example, as shown in FIG. 3, the sensors 48, 50, 52 are coupled to the sensor interface 66 via a wired connection. However, in other embodiments, the sensors 48, 50, 52 may be coupled to the sensor interface 66 via a wireless connection, such as by using any suitable wireless communications protocol known in the art.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 62 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 62 may generally be configured to store suitable computer-readable instructions that, when implemented by the processor(s) 60, configure the controller 26 to perform various functions including, but not limited to, transmitting suitable control signals to implement corrective action(s) in response to a distance signal exceeding a predetermined threshold as described herein, as well as various other suitable computer-implemented functions.

During operation of the wind turbine 10, wind strikes the rotor blades 22 from a direction 28, which causes the rotor 18 to rotate. As the rotor blades 22 are rotated and subjected to centrifugal forces, the rotor blades 22 are also subjected to various forces and bending moments. As such, the rotor blades 22 may deflect from a neutral, or non-deflected, position to a deflected position. As aerodynamic loads increase, excessive forces and bending moments can cause one or more of the rotor blades 22 to strike the tower 12 resulting in significant damage and downtime for the wind turbine 10.

Figure 4:
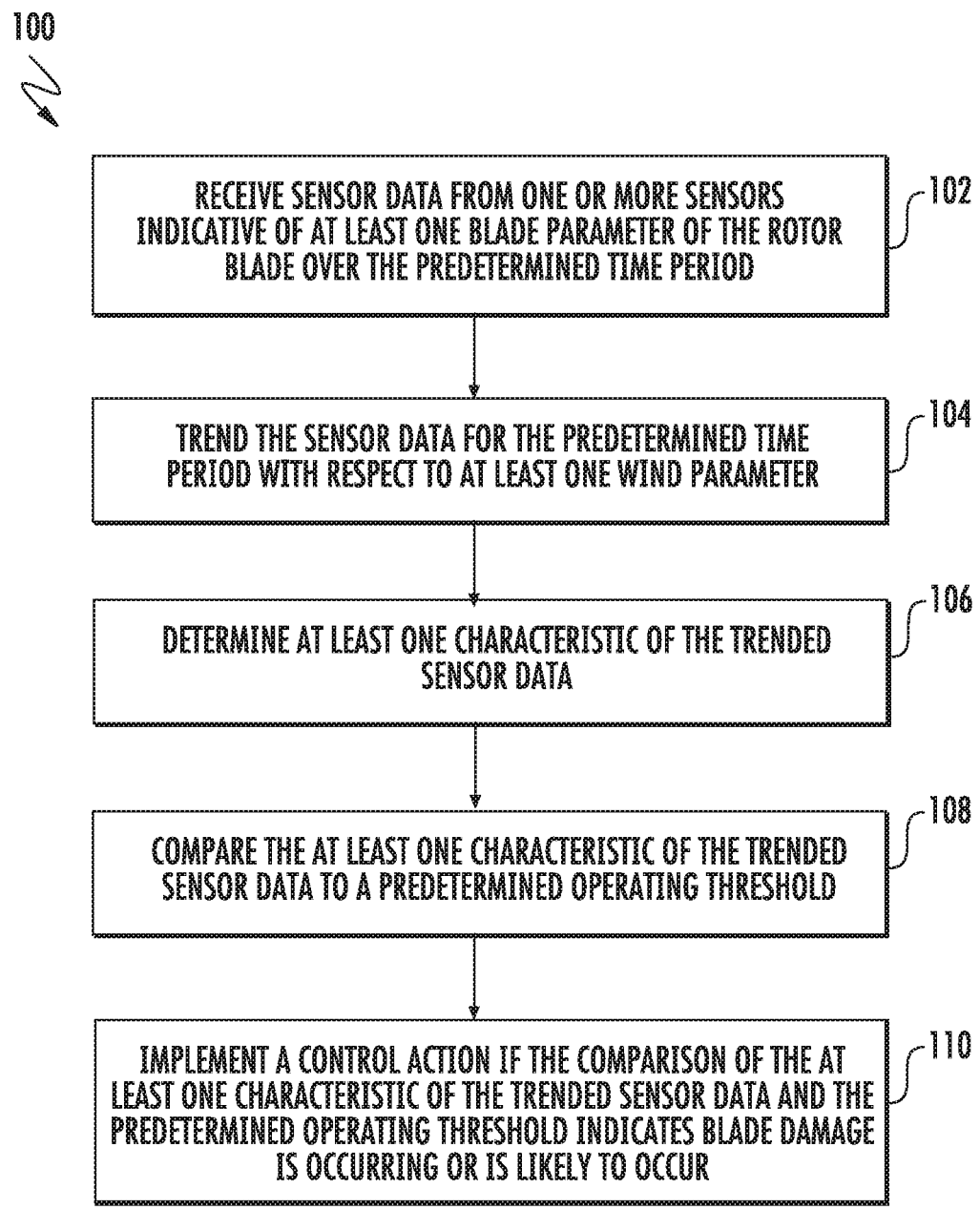
FIG. 4 illustrates a flow diagram of one embodiment of a method for controlling a rotor blade of a wind turbine to minimize blade damage according to the present disclosure.

Thus, the present disclosure is directed to systems and methods for monitoring the rotor blades 22 and controlling the wind turbine 10 to minimize blade damage. Referring now to FIG. 4, a flow diagram of a specific embodiment of a control algorithm 100 that may be executed for minimizing blade damage is illustrated in accordance with aspects of the present subject matter. In general, the control algorithm 100 will be described herein with reference to the wind turbine 10 shown in FIGS. 1 and 2 as well as the controller 26 shown in FIG. 3. However, in other embodiments, the algorithm 100 may be used in connection with any other suitable implement having any other suitable implement configuration and/or with any other suitable system having any other suitable system configuration.

It should be appreciated that, although FIG. 4 depicts control steps or functions performed in a particular order for purposes of illustration and discussion, the control algorithms discussed herein are not limited to any particular order or arrangement. One skilled in the art, using the disclosures provided herein, will appreciate that various steps or functions of the algorithms disclosed herein can be omitted, rearranged, combined, and/or adapted in various ways without deviating from the scope of the present disclosure.

As shown in FIG. 4 at (102), the controller 26 is configured to receive sensor data from the sensors 48, 50, 52. More specifically, in certain embodiments, the sensor data may be indicative of one or more blade parameters of one or more of the rotor blades 22 over a predetermined time period. For example, in one embodiment, the blade parameter(s) may include a pitch angle, a blade mass moment, or any other suitable blade parameter capable of indicating the structural and/or loading characteristics of the rotor blade(s) 22. As such, the controller 26 is configured to evaluate patterns in feedback response. Since the controller 26 is also programmed with has direct, real-time loads regulation algorithms, changes in feedback responses can indicate damage in one or more of the rotor components (e.g. the blades 22, pitch system, encoder, etc.). Accordingly, for wind turbines having load control systems with drivetrain sensors coupled to the controller 26 which can pitch the blades 22 to improve loads handling performance, the blade-mass moment behaviors of the rotor blades 22 can be factored into the blade angle set points used by the controller 26. Thus, the blade/pitch angle behaviors can be partially explained based on the structural aspects and/or unique loading of each individual blade 22.

Still referring to FIG. 4, as shown at (104), the controller 26 may be configured to trend the sensor data for the predetermined time period with respect to at least one wind parameter. For example, in one embodiment, the wind parameter(s) may include wind speed, wind direction, wind turbulence, wind shear, wake, and/or combinations thereof.

Thus, in particular embodiments, the wind parameter(s) may be monitored via the wind sensor(s) 50 described herein and/or may be estimated via the controller 26. In addition, as shown in FIG. 4 at (106), the controller 26 may be configured to determine at least one characteristic of the trended sensor data. For example, in one embodiment, the controller 26 may be configured to determine an average and/or a standard deviation of the sensor data. Accordingly, by using the blade angle behavior captured over the predetermined time period, trends in deviations of blade behavior and/or trends in deviations in high wind speeds can indicate possible blade damage has occurred or is likely to occur.

More specifically, as shown in FIG. 4 at (108), the controller 26 may be configured to compare the characteristic(s) of the trended sensor data to an operating threshold. In certain embodiments, the operating threshold may be predetermined or self-learned. Further, in several embodiments, the controller 26 may be configured to determine whether the characteristic(s) of the trended sensor data (e.g. the average and/or the standard deviation) deviates from a damage threshold by a predetermined amount for a certain wind speed range. In certain embodiments, the damage threshold may be predetermined or self-learned. In alternative or additional embodiments, the controller 26 may be configured to determine whether the characteristic(s) of the trended sensor data deviates from the damage threshold for a certain time period within the predetermined time period (i.e. deviations in trends over time).

Still referring to FIG. 4, as shown at (110), the controller 26 may further be configured to implement a control action if the characteristic(s) of the trended sensor data deviates from the operating threshold. The control action performed by the controller 26 can take many forms. For example, in one embodiment, the control action may include shutting down the wind turbine 10. In another embodiment, the control action may include altering the blade pitch of one or more blades 22. As indicated above, this may be accomplished by controlling one or more of the pitch adjustment mechanisms 32. Generally, altering the blade pitch of one or more of the rotor blades 22 reduces blade loading by increasing out-of-plane stiffness.

In another embodiment, the control action may include modifying the blade loading on the wind turbine 10 by increasing the torque demand on the electrical generator 24 (FIG. 2) positioned within the nacelle 16. This reduces the rotational speed of the rotor blades 22, thereby potentially reducing the aerodynamic loads acting upon the surfaces of the blades 22.

Alternatively, the control action may include yawing the nacelle 16 to change the angle of the nacelle 16 relative to the direction 28 (FIG. 1) of the wind. More specifically, the yaw drive mechanism 38 may be used to change the angle of the nacelle 16 so as to protect various external wind turbine components, such as the transformer, stairs, etc.

It should be readily appreciated, however, that the controller 26 need not perform one of the control actions described above and may generally perform any control action designed to reduce blade loading so as to minimize blade damage. Additionally, the controller 26 may be configured to perform multiple control actions simultaneously, which may include one or more of the control actions described above.

Figure 5:
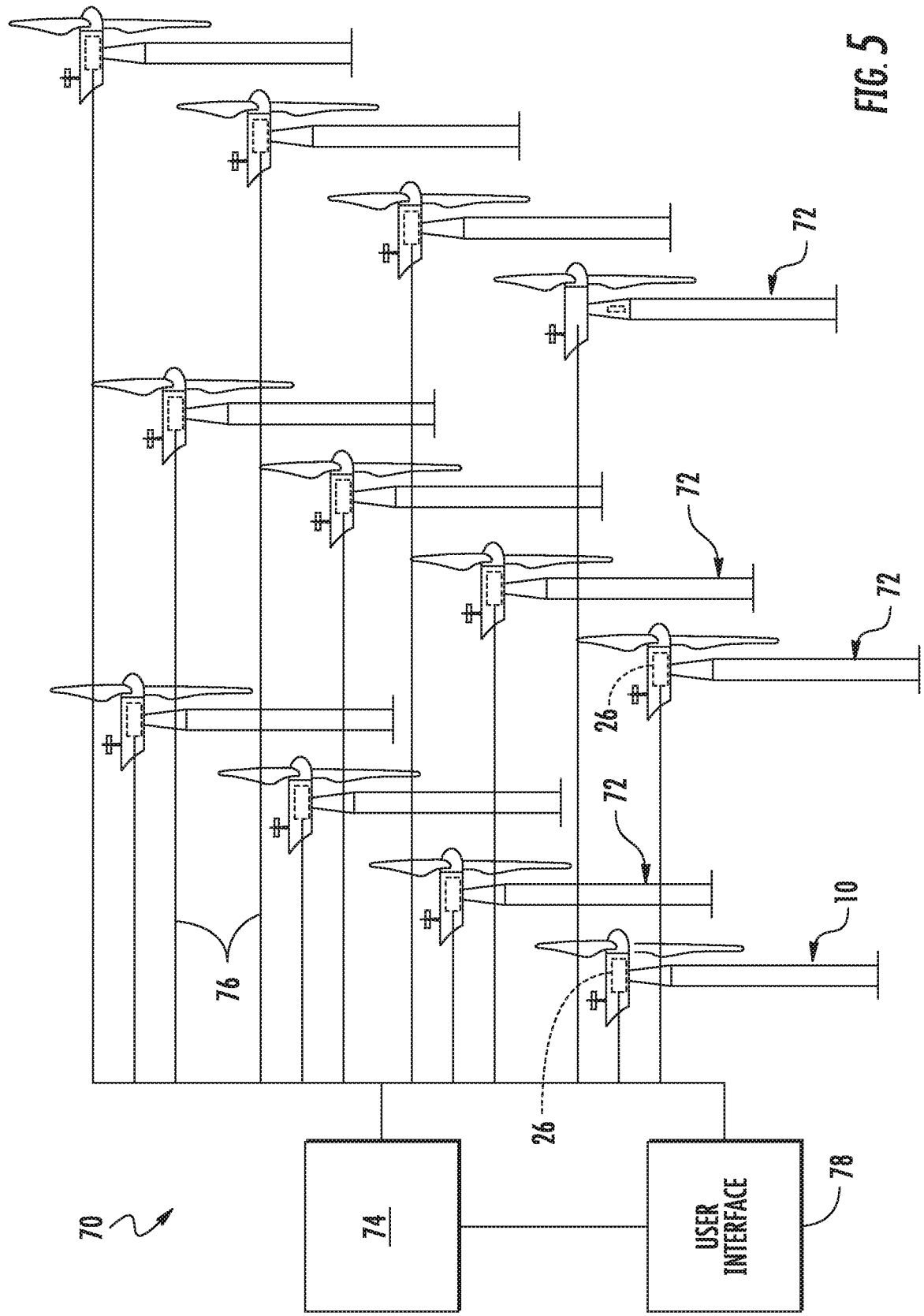
FIG. 5 illustrates a schematic view of one embodiment of a wind farm according to the present disclosure.

Referring now to FIG. 5, it should also be understood that the wind turbine 10 described herein may be part of a wind farm 70 that is controlled according to the system and method of the present disclosure is illustrated. As shown, the wind farm 70 may include a plurality of wind turbines 72, including the wind turbine 10 described above, and a farm-level controller 74. For example, as shown in the illustrated embodiment, the wind farm 70 includes twelve wind turbines, including wind turbine 10. However, in other embodiments, the wind farm 70 may include any other number of wind turbines, such as less than twelve wind turbines or greater than twelve wind turbines. In one embodiment, the controller 26 of the wind turbine 10 may be communicatively coupled to the farm-level controller 74 through a wired connection, such as by connecting the controller 26 through suitable communicative links 76 or networks (e.g., a suitable cable). Alternatively, the controller 26 may be communicatively coupled to the farm-level controller 74 through a wireless connection, such as by using any suitable wireless communications protocol known in the art. In addition, the farm-level controller 74 may be generally configured similar to the controller 26 for each of the individual wind turbines 72 within the wind farm 70.

Accordingly, the controller 26 may also be configured to generate a notification signal when the trended sensor data from any of the rotor blades 22 of any of the wind turbines 72 in the wind farm 70 is indicative of blade damage. Thus, as shown, at least one of the controllers 26, 74 may be configured to send the notification signal to a user, e.g. via a user interface 78, if the characteristic(s) of the trended sensor data deviates from the operating threshold. More specifically, in one embodiment, the notification signal may include a description of which wind turbine 72 in the wind farm 70 is affected, which rotor blade axis is affected and/or a behavior of the affected rotor blade 22. Thus, in particular embodiments, at least one of the controllers 26, 74 may also be configured to receive an instruction from a user via the user interface 78 that indicates whether to implement a control action and/or which type of control action to implement in the event that blade damage is occurring or is imminent.

This written description uses examples to disclose the present subject matter, including the best mode, and also to enable any person skilled in the art to practice the present subject matter, including making and using any devices or systems and performing any incorporated methods. The patentable scope of the present subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling a wind turbine to minimize rotor blade damage, the method comprising: receiving, via a controller, sensor data from one or more sensors indicative of at least one blade parameter of a rotor blade over a predetermined time period; trending, via the controller, the sensor data for the predetermined time period with respect to at least one wind parameter; determining, via the controller, at least one characteristic of the trended sensor data; determining whether, via the controller, the at least one characteristic of the trended sensor data deviates from a damage threshold for a certain time period within the predetermined time period; and, implementing, via the controller, a control action if the deviation of the at least one characteristic of the trended sensor data from the damage threshold indicates rotor blade damage is occurring or is likely to occur.

2. The method of claim 1, wherein the at least one blade parameter comprises at least one of a pitch angle or a blade mass moment.

3. The method of claim 1, wherein the at least one wind parameter comprises at least one of wind speed, wind direction, wind turbulence, wind shear, wake, or combinations thereof.

4. The method of claim 1, wherein the at least one characteristic of the trended sensor data further comprises at least one of an average of the trended sensor data or a standard deviation of the sensor data.

5. The method of claim 1, further comprising determining whether the at least one characteristic of the trended sensor data deviates from the damage threshold by a predetermined amount for a certain wind speed range.

6. The method of claim 1, wherein implementing the control action if the deviation of the at least one characteristic of the trended sensor data from the damage threshold indicates blade damage is occurring or is likely to occur further comprises altering a pitch angle of the rotor blade, shutting down the wind turbine, or yawing a nacelle of the wind turbine.

7. The method of claim 1, further comprising sending a notification signal to a user if the at least one characteristic of the trended sensor data deviates from the damage threshold.

8. The method of claim 7, wherein the notification signal comprises a description of at least one of an affected rotor blade axis or a behavior of the rotor blade.

9. The method of claim 7, further comprising receiving an instruction from a user indicative of whether to implement the control action if the deviation of the at least one characteristic of the trended sensor data and the damage threshold indicates blade damage is occurring or is likely to occur.

10. A method for controlling a wind turbine to minimize rotor blade damage, the method comprising:
receiving sensor data from one or more sensors indicative of a blade mass moment of a rotor blade of the wind turbine over a predetermined time period;
trending the sensor data for the predetermined time period with respect to wind speed;
determining at least one characteristic of the trended sensor data;
determining whether the at least one characteristic of the trended sensor data deviates from a damage threshold for a certain time period within the predetermined time period;
modifying a pitch angle set point of the rotor blade if the deviation of the at least one characteristic of the trended sensor data from the damage threshold indicates blade damage is occurring or is likely to occur; and
operating the rotor blade at the adjusted pitch angle set point.

11. A system for controlling a wind turbine to minimize rotor blade damage, the system comprising: at least one sensor for generating sensor data indicative of at least one blade parameter of a rotor blade over a predetermined time period; a controller communicatively coupled to the at least one sensor, the controller comprising a processor and associated memory device, the memory device comprising instructions that, when implemented the processor, configure the controller to perform one or more operations, the one or more operations comprising: trending the sensor data for the predetermined time period with respect to at least one wind parameter; determining at least one characteristic of the trended sensor data; determining whether the at least one characteristic of the trended sensor data deviates from a damage threshold for a certain time period within the predetermined time period; and, implementing a control action if the deviation of the at least one characteristic of the trended sensor data from the damage threshold indicates rotor blade damage is occurring or is likely to occur.

12. The system of claim 11, wherein the at least one blade parameter comprises a pitch angle.

13. The system of claim 11, wherein the at least one wind parameter comprises at least one of wind speed, wind direction, wind turbulence, wind shear, wake, or combinations thereof.

14. The system of claim 11, wherein the at least one characteristic of the trended sensor data further comprises at least one of an average of the trended sensor data or a standard deviation of the sensor data.

15. The system of claim 11, further comprising determining whether the at least one characteristic of the trended sensor data deviates from the damage threshold by a predetermined amount for a certain wind speed range.

16. The system of claim 11, wherein implementing the control action if the deviation of the at least one characteristic of the trended sensor data from the damage threshold indicates blade damage is occurring or is likely to occur further comprises altering a pitch angle of the rotor blade, shutting down the wind turbine, or yawing a nacelle of the wind turbine.

17. The system of claim 11, wherein the one or more operations further comprise sending a notification signal to a user if the at least one characteristic of the trended sensor data deviates from the damage threshold, the notification signal comprising a description of at least one of an affected rotor blade axis or a behavior of the rotor blade.

18. The system of claim 11, wherein the one or more operations further comprise receiving an instruction from a user indicative of whether to implement a control action if the at least one characteristic of the trended sensor data deviates from the damage threshold.

* * * * *